(12) United States Patent
Ekanayake et al.

(10) Patent No.: US 10,036,321 B2
(45) Date of Patent: Jul. 31, 2018

(54) SYSTEMS AND METHODS FOR UTILIZING GAS TURBINE COMPARTMENT VENTILATION DISCHARGE AIR

(71) Applicant: General Electric Company, Schenectady, NY (US)

(72) Inventors: Sanji Ekanayake, Atlanta, GA (US); Alston Ilford Scipio, Atlanta, GA (US); Joseph Klosinski, Atlanta, GA (US); Pierre Antoine Semel, Belfort (FR)

(73) Assignee: General Electric Company, Schenectady, NY (US)

( * ) Notice: Subject to any disclaimer, the term of this patent is extended or adjusted under 35 U.S.C. 154(b) by 635 days.

(21) Appl. No.: 14/290,580

(22) Filed: May 29, 2014

(65) Prior Publication Data

US 2015/0345393 A1   Dec. 3, 2015

(51) Int. Cl.
| | |
|---|---|
| *F02C 7/04* | (2006.01) |
| *F02C 1/08* | (2006.01) |
| *F02C 9/18* | (2006.01) |
| *F02C 7/08* | (2006.01) |
| *F01D 25/14* | (2006.01) |
| *F02C 7/047* | (2006.01) |

(52) U.S. Cl.
CPC ............. *F02C 7/08* (2013.01); *F01D 25/145* (2013.01); *F02C 1/08* (2013.01); *F02C 9/18* (2013.01); *F02C 7/047* (2013.01)

(58) Field of Classification Search
CPC .... F02C 7/08; F02C 7/047; F02C 7/20; F02C 9/18
See application file for complete search history.

(56) References Cited

U.S. PATENT DOCUMENTS

| | | | | |
|---|---|---|---|---|
| 3,705,491 | A | * | 12/1972 | Foster-Pegg .......... F01K 21/042 60/242 |
| 4,328,666 | A | * | 5/1982 | Cummins, Jr. ......... F02C 7/047 60/39.093 |
| 4,561,245 | A | | 12/1985 | Ball et al. |
| 5,560,195 | A | * | 10/1996 | Anderson ................ F02C 7/08 417/80 |

(Continued)

OTHER PUBLICATIONS

Co-pending U.S. Appl. No. 14/060,829, filed Oct. 23, 2013, entitled: "Method and System for Improving the Efficiency of a Simple Cycle Gas Turbine System With a Closed Circuit Fuel Heating System".

(Continued)

*Primary Examiner* — Lorne Meade
*Assistant Examiner* — Eric Linderman
(74) *Attorney, Agent, or Firm* — Eversheds Sutherland (US) LLP

(57) ABSTRACT

Systems and methods for utilizing gas turbine compartment ventilation discharge air. In one embodiment, a system may include a gas turbine engine having a compressor. The system also may include a gas turbine compartment disposed about the gas turbine engine. Moreover, the system may include an inlet bleed heat (IBH) manifold in fluid communication with the compressor. The gas turbine compartment may be in fluid communication with the IBH manifold for providing the IBH manifold with ventilation discharge air from the gas turbine compartment.

14 Claims, 8 Drawing Sheets

(56) References Cited

U.S. PATENT DOCUMENTS

| | | | | |
|---|---|---|---|---|
| 6,027,304 A * | 2/2000 | Arar | F02C 7/045 | 415/116 |
| 6,442,942 B1 * | 9/2002 | Kopko | F02C 3/36 | 60/726 |
| 6,666,026 B2 * | 12/2003 | Jungsch | F01D 15/10 | 60/39.093 |
| 6,685,425 B2 * | 2/2004 | Poccia | F02C 7/08 | 415/116 |
| 7,421,835 B2 * | 9/2008 | Rabovitser | F02C 7/143 | 60/39.12 |
| 7,716,930 B2 | 5/2010 | Chillar et al. | | |
| 8,261,528 B2 * | 9/2012 | Chillar | F02C 1/08 | 244/134 R |
| 8,844,258 B2 * | 9/2014 | Ekanayake | F02C 7/047 | 60/39.093 |
| 9,027,354 B2 * | 5/2015 | Velez | F02C 3/13 | 60/782 |
| 9,470,150 B2 * | 10/2016 | Zhang | F02C 7/143 | |
| 2005/0072164 A1 * | 4/2005 | MacKay | F01D 15/10 | 60/805 |
| 2006/0130454 A1 * | 6/2006 | Liang | F02C 6/18 | 60/39.01 |
| 2009/0301078 A1 | 12/2009 | Chillar et al. | | |
| 2010/0003123 A1 * | 1/2010 | Smith | F02C 3/34 | 415/116 |
| 2010/0050873 A1 * | 3/2010 | Hiner | B01D 46/0024 | 95/283 |
| 2010/0089023 A1 * | 4/2010 | Harada | F01K 23/10 | 60/39.182 |
| 2010/0175388 A1 * | 7/2010 | Tillery | F01D 25/10 | 60/785 |
| 2010/0232945 A1 * | 9/2010 | Zhang | F01D 25/10 | 415/177 |
| 2011/0162383 A1 * | 7/2011 | Zhang | F01D 25/30 | 60/782 |
| 2011/0247313 A1 * | 10/2011 | Chillar | F02C 1/08 | 60/39.093 |
| 2013/0000321 A1 * | 1/2013 | Arar | F02C 6/08 | 60/785 |
| 2013/0115061 A1 * | 5/2013 | Ponyavin | F02C 7/045 | 415/177 |
| 2013/0115062 A1 * | 5/2013 | Ponyavin | F01D 17/00 | 415/177 |
| 2013/0125557 A1 * | 5/2013 | Scipio | F02C 9/22 | 60/773 |
| 2013/0193127 A1 * | 8/2013 | Scipio | F02C 7/047 | 219/201 |
| 2013/0219916 A1 * | 8/2013 | Desai | F02C 7/057 | 60/782 |
| 2013/0239573 A1 * | 9/2013 | Brighenti | F01K 21/00 | 60/643 |
| 2013/0340439 A1 * | 12/2013 | Ekanayake | F02C 7/047 | 60/779 |
| 2014/0060774 A1 * | 3/2014 | Motakef | F02C 7/047 | 165/48.1 |
| 2014/0123853 A1 * | 5/2014 | Desai | B01D 46/0086 | 95/280 |
| 2014/0126991 A1 * | 5/2014 | Ekanayake | F02C 7/143 | 415/1 |
| 2014/0144124 A1 * | 5/2014 | Mazumder | F02C 7/047 | 60/39.093 |
| 2014/0294566 A1 * | 10/2014 | Kumar | F02C 7/047 | 415/115 |
| 2014/0321967 A1 * | 10/2014 | Zhang | F02C 7/143 | 415/1 |
| 2015/0068217 A1 * | 3/2015 | Merchant | F02C 7/045 | 60/782 |
| 2015/0322861 A1 * | 11/2015 | Scipio | F02C 9/18 | 60/773 |
| 2015/0345390 A1 * | 12/2015 | Ekanayake | F02C 7/047 | 60/779 |
| 2015/0345401 A1 * | 12/2015 | Ekanayake | F02C 7/224 | 60/775 |
| 2015/0377126 A1 * | 12/2015 | Harper | F02C 6/08 | 60/782 |
| 2016/0061056 A1 * | 3/2016 | Appukuttan | F01D 25/10 | 415/144 |
| 2016/0160682 A1 * | 6/2016 | Smith | F01D 15/10 | 290/40 R |
| 2016/0273409 A1 * | 9/2016 | Ekanayake | F01K 23/105 | |
| 2017/0051668 A1 * | 2/2017 | Kraft | F02C 7/047 | |

OTHER PUBLICATIONS

Li, X. et al., "Thermal and Economic Analyses of Energy Saving by Enclosing Gas Turbine Combustor Section," Proceedings of 28th Industrial Energy Technology Conference (IETC), pp. 9 (May 10-13, 2006).

* cited by examiner

SYSTEMS AND METHODS FOR UTILIZING GAS TURBINE COMPARTMENT VENTILATION DISCHARGE AIR

FIELD OF THE DISCLOSURE

The disclosure relates generally to gas turbine engines and more particularly relates to systems and methods for utilizing gas turbine compartment ventilation discharge air.

BACKGROUND

Gas turbine engines are utilized globally for electric power generation or as mechanical drives for operating equipment under a variety of climatic conditions. Operation during cold ambient temperature and high humidity conditions often causes ice to build up on the inlet filter house components and the compressor components. Compressor aeromechanical stresses are also increased under these low ambient temperature conditions when coupled with reduced load or output operation. Gas turbine turndown is also limited during low ambient temperature conditions due to combustor lean operation limit, creating excessive emissions. Additionally, compressor inlet guide vane closure required to attain reduced loads undesirably worsens the gas turbine efficiency.

SUMMARY

Some or all of the above needs and/or problems may be addressed by certain embodiments of the disclosure. The disclosure provides systems and methods for utilizing gas turbine compartment ventilation discharge air. In one embodiment, a system may include a gas turbine engine having a compressor. The system also may include a gas turbine compartment disposed about the gas turbine engine. Moreover, the system may include an inlet bleed heat (IBH) manifold in fluid communication with the compressor. The gas turbine compartment may be in fluid communication with the IBH manifold for providing the IBH manifold with ventilation discharge air from the gas turbine compartment.

In another embodiment, the disclosure provides a method for utilizing gas turbine compartment ventilation discharge air. The method includes filtering air provided to a gas turbine compartment and providing ventilation discharge air from the gas turbine compartment to an IBH manifold.

In yet another embodiment, the disclosure provides system for utilizing gas turbine compartment ventilation discharge air. The system includes a compressor, a combustor in communication with the compressor, and a turbine in communication with the combustor. The system also includes a gas turbine compartment disposed about one or more of the compressor, the combustor, and the turbine. Moreover, the system includes an IBH manifold in fluid communication with the compressor. The gas turbine compartment may be in fluid communication with the IBH manifold for providing the IBH manifold with ventilation discharge air from the gas turbine compartment.

These and other embodiments, aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION

Figure 1:
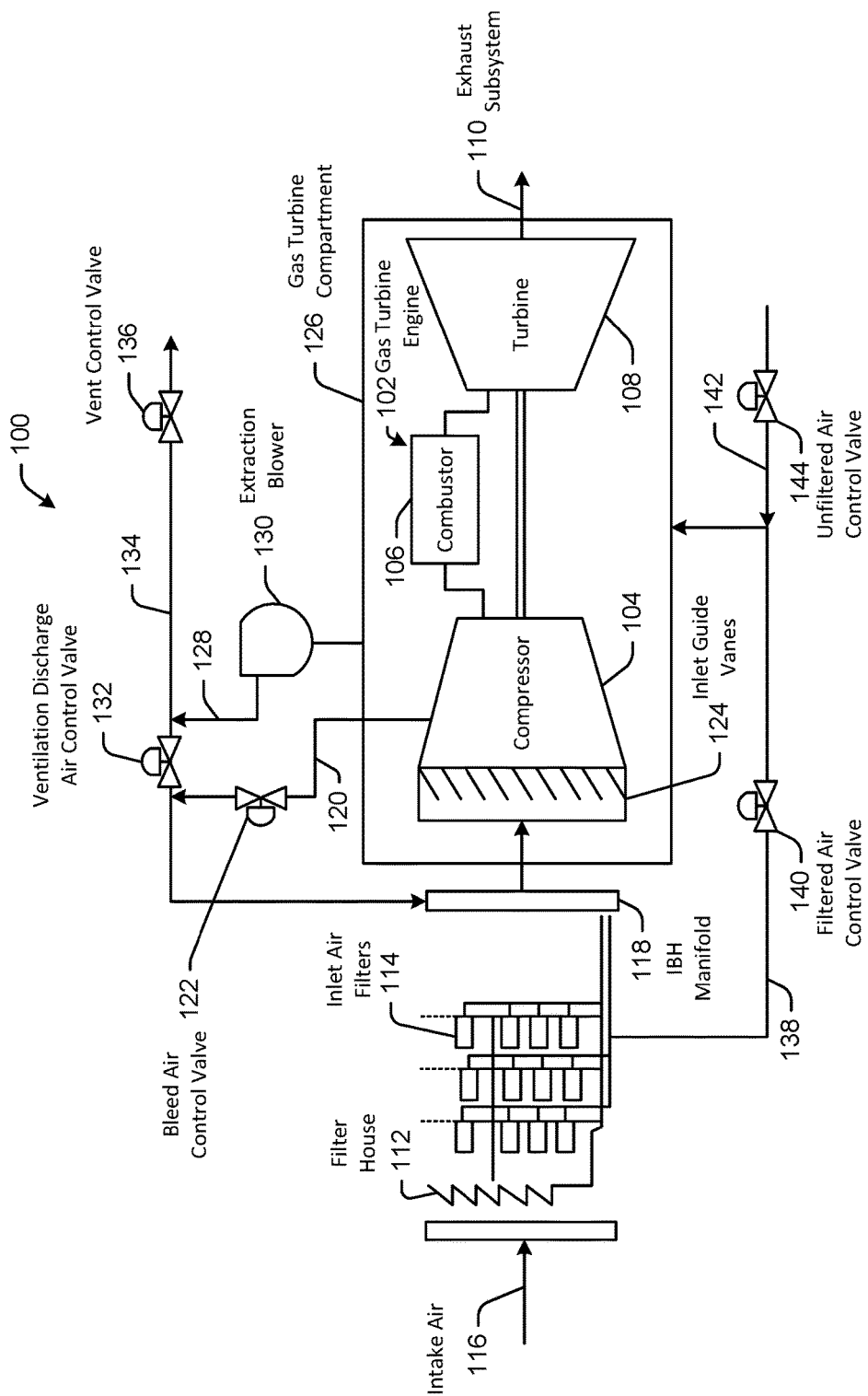
FIG. 1 is a schematic view of a system according to one or more embodiments.

Referring now to the drawings, in which like numerals refer to like elements throughout the several views, FIG. 1 is an example embodiment of a system 100 for utilizing gas turbine compartment ventilation discharge air. The system 100 may include one or more gas turbine engines 102. Each gas turbine engine 102 may include a compressor 104, a combustor 106, and a turbine 108. The compressor 104 may compress an incoming flow of air. The compressor 104 may deliver the compressed flow of air to the combustor 106, where the compressed flow of air mixes with a compressed flow of fuel. The air/fuel mixture may be ignited to create a flow of combustion gases. The flow of combustion gases may be delivered to the turbine 108. The flow of combustion gases may drive the turbine 108 to produce mechanical work. The mechanical work produced in the turbine 108 may drive the compressor 104 and an external load, such as an electrical generator or the like. The flow of combustion gases may be exhausted via an exhaust subsystem 110 or the like to a stack, a heat recovery steam generator, or otherwise disposed.

The gas turbine engine 102 may use natural gas, various types of syngas, and/or other types of fuels. The gas turbine engine 102 may be anyone of a number of different gas turbine engines such as those offered by General Electric Company of Schenectady, N.Y. and the like. The gas turbine engine 102 may have different configurations and may use other types of components. Other types of gas turbine engines also may be used herein. Multiple gas turbine engines, other types of turbines, and other types of power generation equipment also may be used herein together.

The gas turbine engine 102 may include a filter house 112. The filter house 112 may include one or more filter assemblies having a number of inlet air filters 114 that remove moisture and/or particulate matter (such as dust and/or debris) from ambient intake air 116 channeled to the gas turbine engine 102. Other filter assemblies maybe used herein.

In some instances, an IBH manifold 118 may be in fluid communication with the compressor 104. For example, an outlet of the compressor 104 may be in fluid communication with the IBH manifold 118 by way of at least one conduit 120. The conduit 120 may provide the IBH manifold 118 with compressor bleed air. In this manner, a portion of the compressor discharge air may be recirculated back to an inlet of the compressor 104. The recirculated compressor discharge air may be mixed with the colder ambient intake air 116. In some instances, a bleed air control 122 valve may be disposed between the outlet of the compressor 104 and the IBH manifold 118. The bleed air control valve 122 may be configured to regulate the compressor bleed air provided to the IBH manifold 118. In addition, the compressor 104 may include one or more inlet guide vanes 124.

The gas turbine engine 102 may be wholly or partially enclosed by a gas turbine compartment 126. During operation of the gas turbine engine 102, waste heat may be released into the gas turbine compartment 126, which in turn may heat the air within the gas turbine compartment 126. In some instances, the system 100 may utilize the waste heat from the gas turbine compartment 126. For example, at least one conduit 128 may fluidly couple the gas turbine compartment 126 with the IBH manifold 118. In this manner, the IBH manifold 118 may be supplied with ventilation discharge air from the gas turbine compartment 126. In some instances, the heated ventilation discharge air may be mixed with the colder ambient intake air 116 at the IBH manifold 118.

The ventilation discharge air from the gas turbine compartment 126 may be extracted from the gas turbine compartment 126 by at least one extraction blower 130 (or exhaust fan) disposed about the conduit 128. That is, the extraction blower 130 may draw the heated air out of the gas turbine compartment 126. In some instances, the heated air from the gas turbine compartment 126 may be supplied to the IBH manifold 118. For example, a ventilation discharge air control valve 132 may be disposed between the gas turbine compartment 126 and the IBH manifold 118. The ventilation discharge air control valve 132 may be configured to regulate the ventilation discharge air provided to the IBH manifold 118.

In other instances, the heated air from the gas turbine compartment 126 may be discharged to the atmosphere. For example, at least one conduit 134 may fluidly couple the gas turbine compartment 126 with the atmosphere. In some instances, a vent control valve 136 may be disposed between the gas turbine compartment 126 and the atmosphere. The vent control valve 136 may be configured to regulate the ventilation discharge air from the gas turbine compartment 126 that is vented to the atmosphere. In some instances, a portion of the ventilation discharge air may be vented to the atmosphere, while another portion of the ventilation discharge air may be supplied to the IBH manifold 118.

In certain embodiments, the compressor bleed air and the ventilation discharge air may be mixed together. For example, the ventilation discharge air control valve 132 and/or the bleed air control valve 122 may be adjusted to provide the IBH manifold 118 with a mixture of compressor bleed air and/or ventilation discharge air from the gas turbine compartment 126.

The gas turbine compartment 126 may be supplied with filtered and/or unfiltered air. For example, at least one conduit 138 may fluidly couple the filter house 112 and the gas turbine compartment 126. In this manner, the gas turbine compartment 126 may be provided with filtered air from the filter house 112. In other instances, the gas turbine compartment 126 may in communication with a filter that is separate from the filter house 112. That is, the gas turbine compartment 126 may have its own dedicated filter assembly. In some instances, a filtered air control valve 140 may be disposed between the filter house 112 and the gas turbine compartment 126. The filtered air control valve 140 may be configured to regulate the filtered air provided to the gas turbine compartment 126.

In other instances, the gas turbine compartment 126 may be in fluid communication with the atmosphere by way of at least one conduit 142 such that the gas turbine compartment 126 may be supplied with unfiltered air. For example, an unfiltered air control valve 144 may be disposed between the gas turbine compartment 126 and the atmosphere. The unfiltered air control valve 144 may be configured to regulate the unfiltered air provided to the gas turbine compartment 126. In certain embodiments, the filtered and unfiltered air may be mixed together. For example, the filtered air control valve 140 and/or the unfiltered air control valve 144 may be adjusted to provide the gas turbine compartment 126 with a mixture of filtered and unfiltered air.

Figure 2:
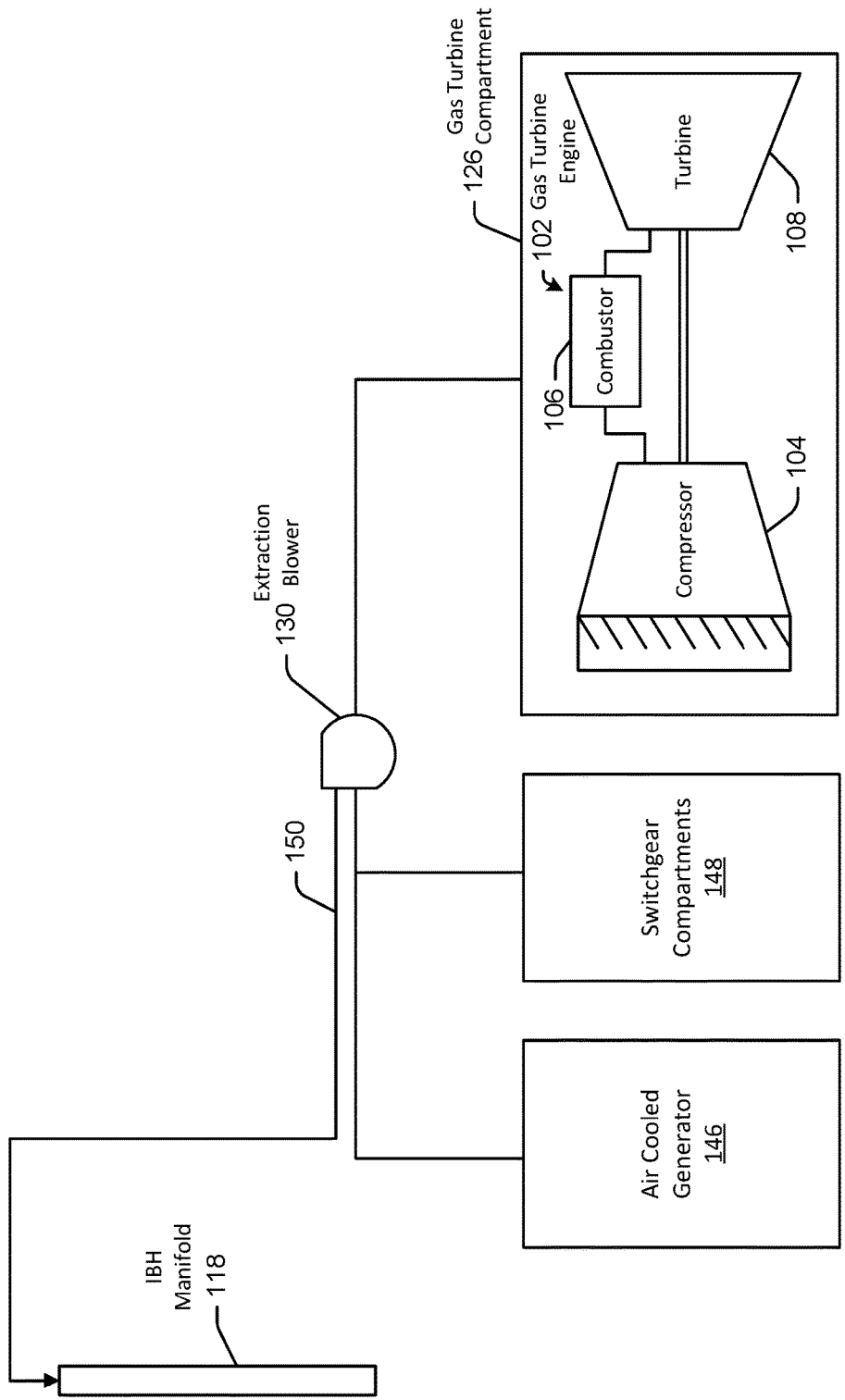
FIG. 2 is a schematic view of a system according to one or more embodiments.

In some instances, additional sources of waste heat may be used in conjunction with or alternative to the waste heat from the gas turbine compartment 126. For example, as depicted in FIG. 2, waste heat (such as heated air) from an air cooled generator 146 and/or switchgear compartments 148 may be used. In some instances, at least one conduit 150 may fluidly couple the IBH manifold 118 with the gas turbine compartment 126, the air cooled generator 146, and/or switchgear compartment 148. In addition, the extraction blower 130 may draw the heated air out of the gas turbine compartment 126, the air cooled generator 146, and/or switchgear compartment 148. Moreover, one or move control valves (not shown) may be disposed about the one or more conduits 136 to control the flow or combination of flows therein.

Figure 3:
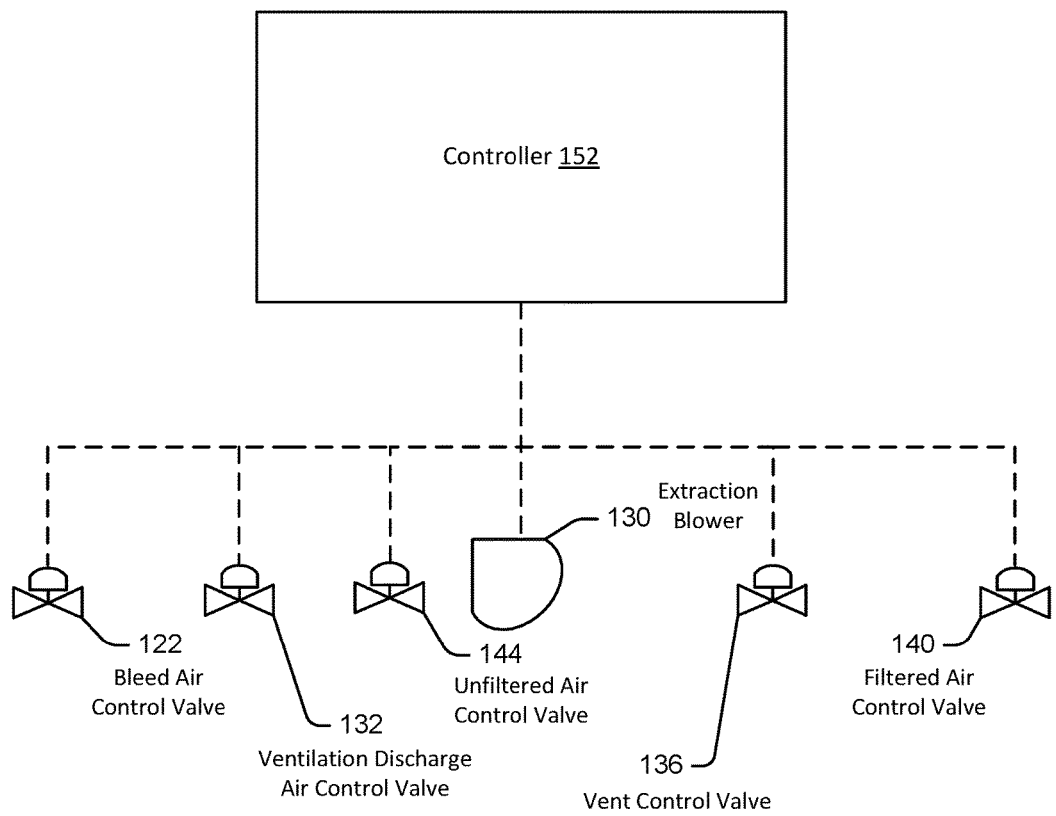
FIG. 3 is a schematic of an embodiment of a control system according to one or more embodiments.

As depicted in FIG. 3, the position of the bleed air control 122 valve, the ventilation discharge air control valve 132, the vent control valve 136, the filtered air control valve 140, and/or the unfiltered air control valve 144 may be controlled by a controller 152. The controller 152 also may control the extraction blower 130. Moreover, the controller 152 may receive inputs from one or more sensors disposed about the various conduits, the filter house 112, the inlet air filters 114, the IBH manifold 118, the compressor 104, etc. The controller 152 may be configured to activate one or more actuators. The controller 152 may be an independent controller or integrated with a gas turbine control system. The controller 152 may include at least a memory and one or more processing units (or processor(s)). The processor(s) may be implemented as appropriate in hardware, software, firmware, or combinations thereof. Software or firmware implementations of the processor(s) may include computer-executable or machine-executable instructions written in any suitable programming language to perform the various functions described herein. Moreover, the processor may be associated with a network, a server, a computer, or a mobile device.

Figure 4:
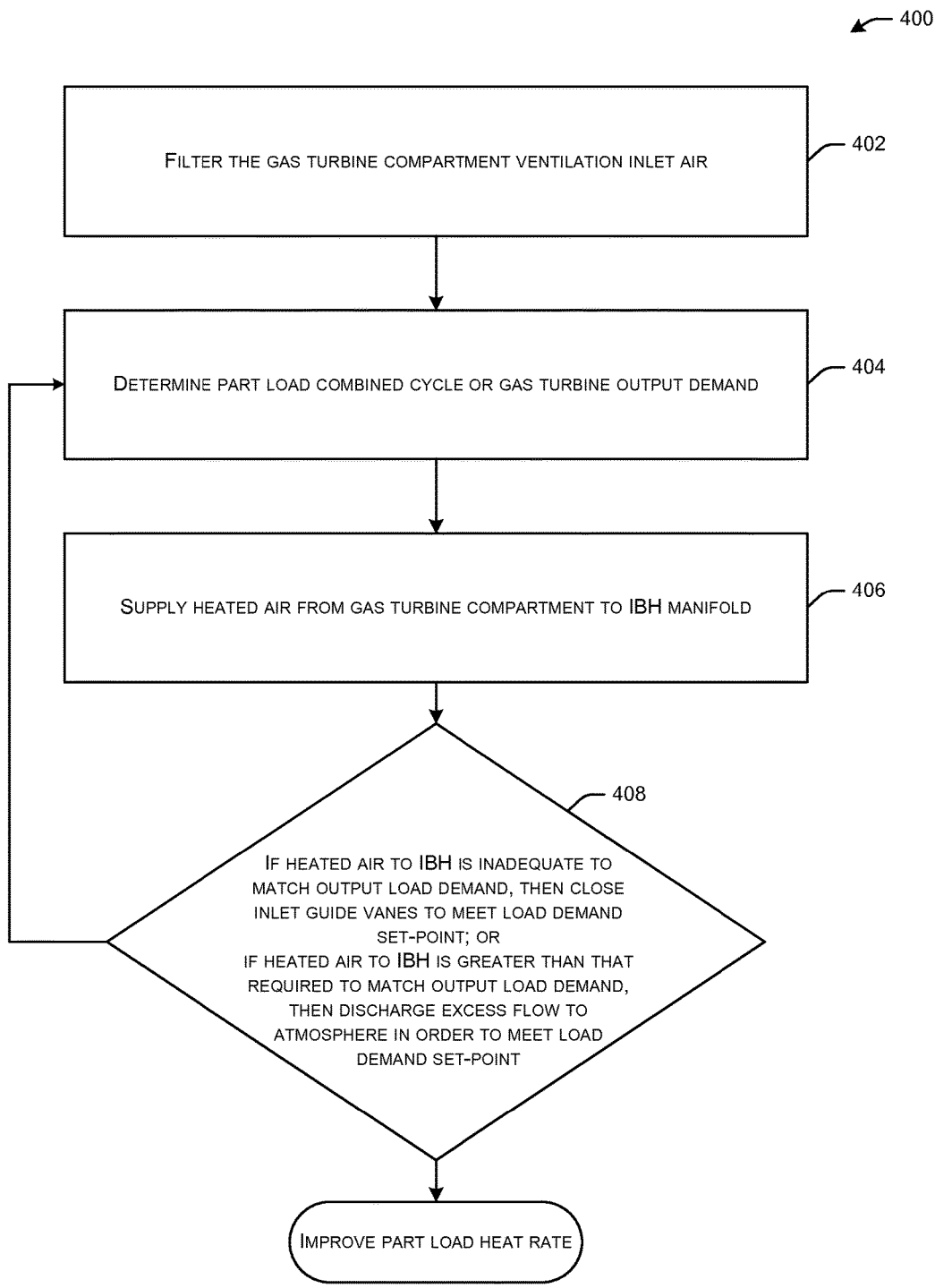
FIG. 4 is a flow chart illustrating a method according to one or more embodiments.

FIG. 4 is a flow chart illustrating a method 400 for utilizing gas turbine compartment ventilation discharge air according to one or more embodiments of the disclosure to improve gas turbine and combined cycle heat rate. At block 402, the ventilation discharge air may be filtered. For example, the gas turbine compartment 126 may be provided with filtered air from the filter house 112, or the gas turbine compartment 126 may in communication with a filter that is separate from the filter house 112. At block 404, a part load gas turbine or combined cycle output demand may be determined. At block 406, heated air from the gas turbine compartment 126 may be supplied to the IBH manifold 118. At block 408, if the heated air flow to the IBH manifold 118 is inadequate to match output load demand, then the inlet guide vanes 124 may be closed to meet a load demand set-point. Alternatively, if the heated air flow to the IBH manifold 118 is greater than that required to match the output load demand, then excess flow may be discharged to the atmosphere in order to meet the load demand set-point.

Figure 5:
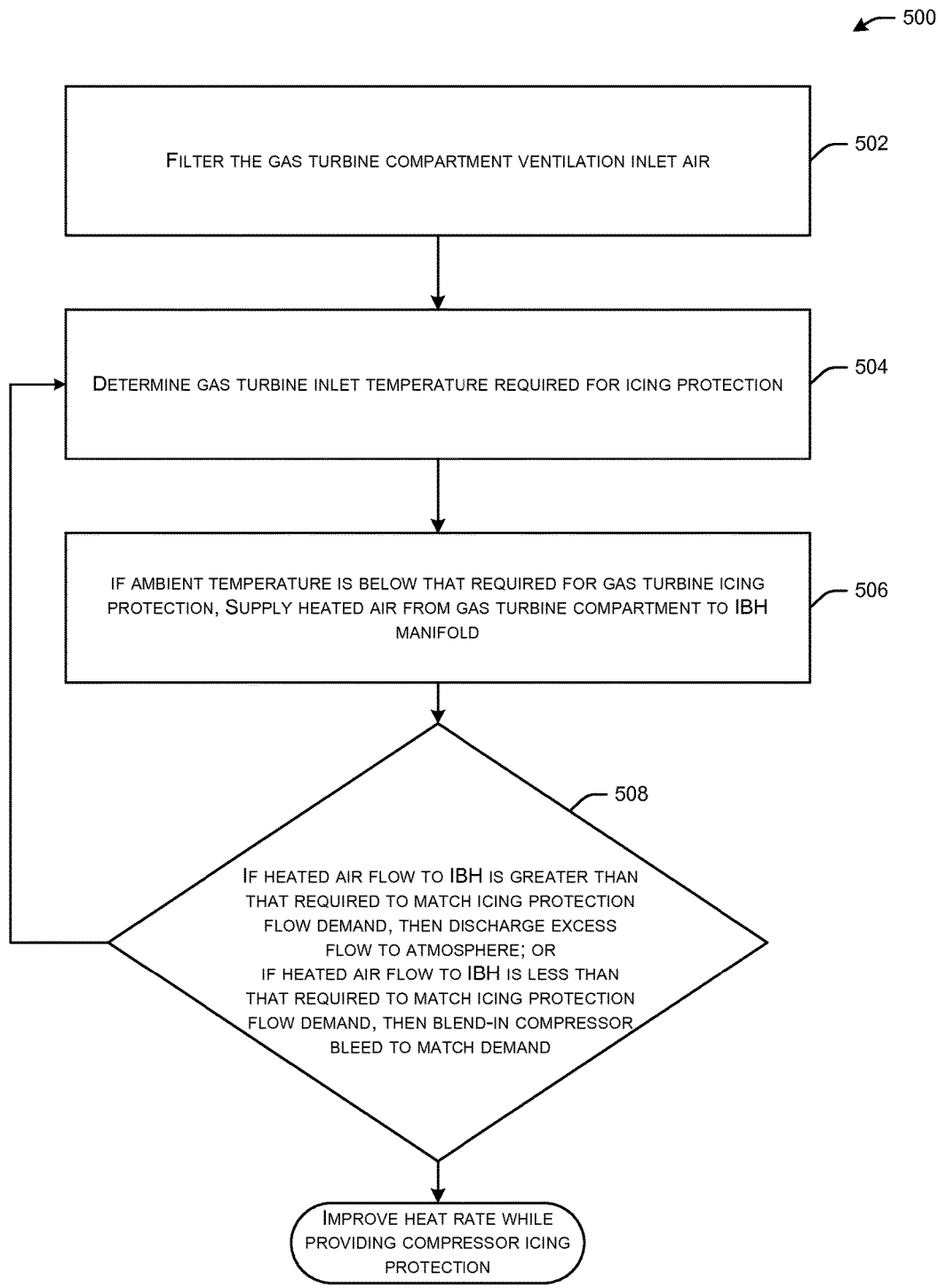
FIG. 5 is a flow chart illustrating a method according to one or more embodiments.

FIG. 5 is a flow chart illustrating a method 500 for utilizing gas turbine compartment ventilation discharge air according to one or more embodiments of the disclosure to provide icing protection with improved heat rate. At block 502, the ventilation discharge air may be filtered. For example, the gas turbine compartment 126 may be provided with filtered air from the filter house 112, or the gas turbine compartment 126 may in communication with a filter that is separate from the filter house 112. At block 504, gas turbine inlet temperature for icing protection may be determined. At block 506, if the ambient temperature is below that required for icing protection, then heated air from the gas turbine compartment 126 may be supplied to the IBH manifold 118. At block 508, if the heated air flow to IBH manifold 118 is greater than that required to match icing protection, then excess flow may be discharged to the atmosphere. Alternatively, if the heated air flow to IBH manifold 118 is less than that required to match icing protection, then compressor bleed air may be blended with the heated air to match demand.

Figure 6:
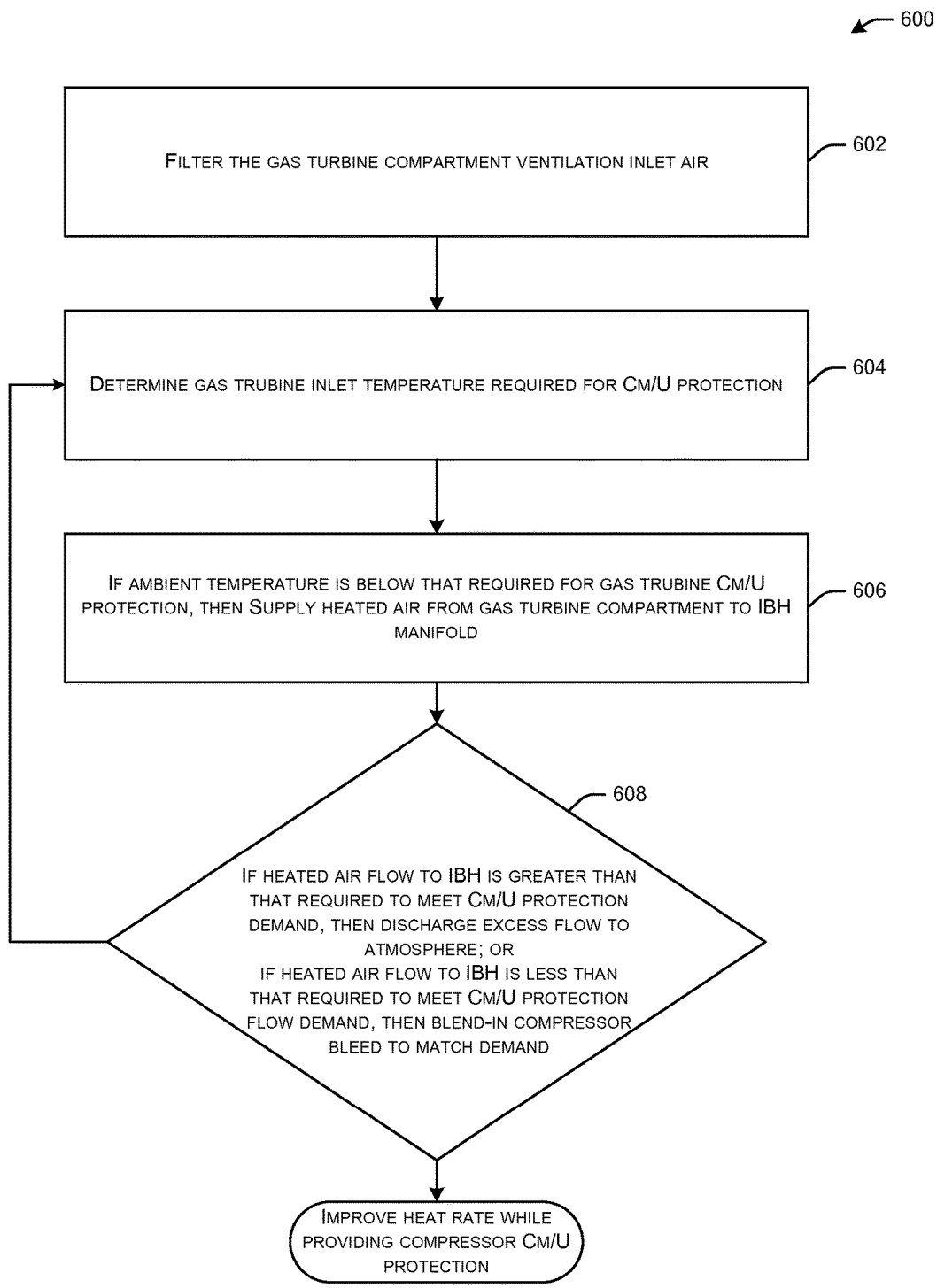
FIG. 6 is a flow chart illustrating a method according to one or more embodiments.

FIG. 6 is a flow chart illustrating a method 600 for utilizing gas turbine compartment ventilation discharge air according to one or more embodiments of the disclosure for compressor aeromechanical stress protection, also known as Cm/U protection. At block 602, the ventilation discharge air may be filtered. For example, the gas turbine compartment 126 may be provided with filtered air from the filter house 112, or the gas turbine compartment 126 may in communication with a filter that is separate from the filter house 112. At block 604, gas turbine inlet temperature required for Cm/U protection may be determined. Cm/U is the axial flow velocity divided by the circumferential flow velocity of the compressor. At block 606, if the ambient temperature is below that required for Cm/U protection, then heated air from gas turbine compartment may be supplied to the IBH manifold 118. At block 608, if the heated air flow to IBH manifold is greater than that required to meet Cm/U protection demand, then excess flow may be discharged to the atmosphere. Alternatively, if the heated air flow to IBH manifold 118 is less than that required to meet Cm/U protection, then compressor bleed air may be blended with the heated air to match demand.

Figure 7:
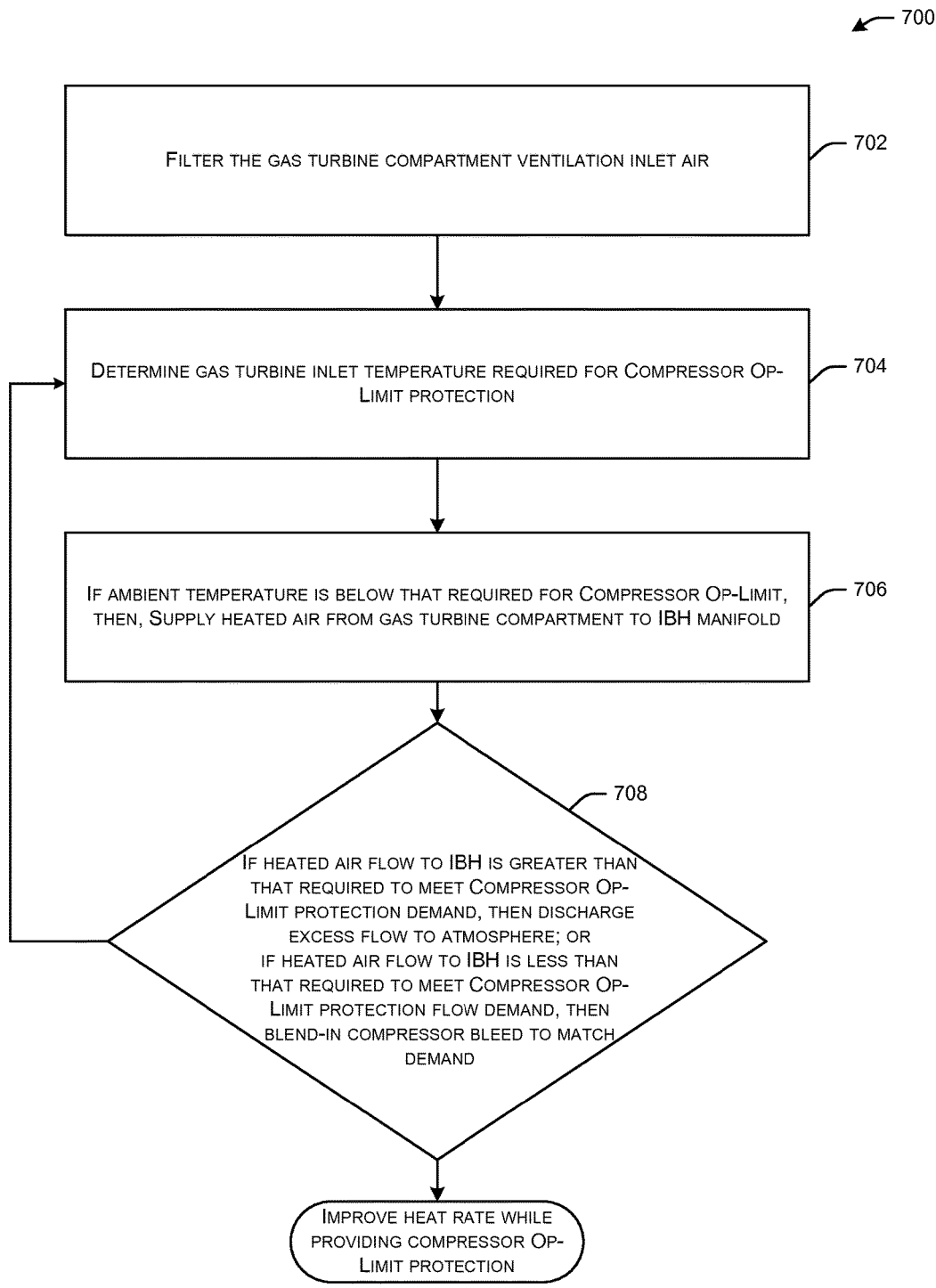
FIG. 7 is a flow chart illustrating a method according to one or more embodiments.

FIG. 7 is a flow chart illustrating a method 700 for utilizing gas turbine compartment ventilation discharge air according to one or more embodiments of the disclosure. At block 702, the ventilation discharge air may be filtered. For example, the gas turbine compartment 126 may be provided with filtered air from the filter house 112, or the gas turbine compartment 126 may in communication with a filter that is separate from the filter house 112. At block 704, the gas turbine inlet temperature for compressor operational limit protection against stall and surge, also known as op-limit protection, may be determined. At block 706, if the ambient temperature is below that required for compressor op-limit protection, then heated air from gas turbine compartment may be supplied to the IBH manifold 118. At block 708, if the heated air flow to IBH manifold is greater than that required to meet compressor op-limit demand, then excess flow may be discharged to the atmosphere. Alternatively, if the heated air flow to IBH manifold 118 is less than that required to meet compressor op-limit demand, then compressor bleed air may be blended with the heated air to match demand.

Figure 8:
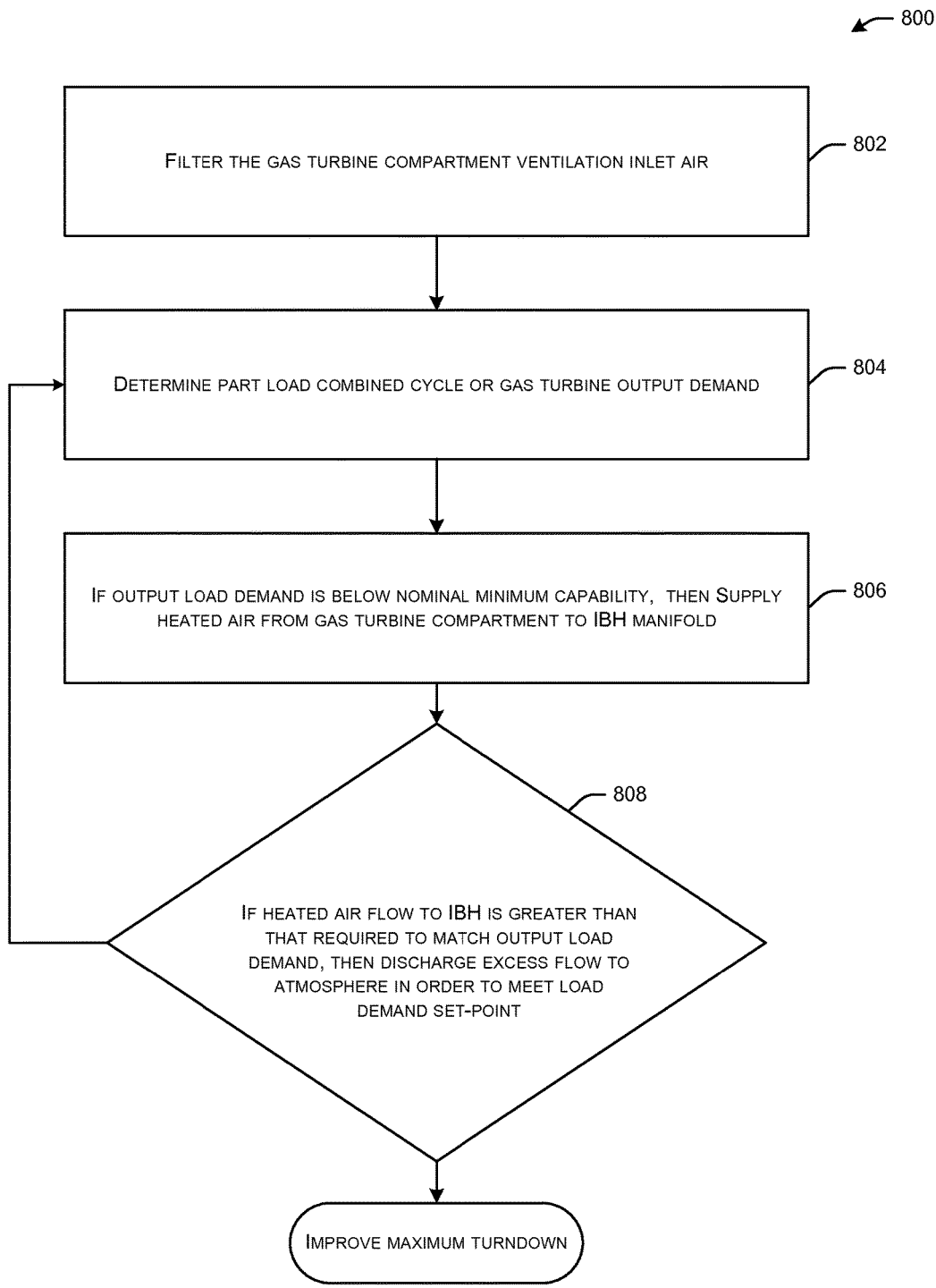
FIG. 8 is a flow chart illustrating a method according to one or more embodiments.

FIG. 8 is a flow chart illustrating a method 800 for utilizing gas turbine compartment ventilation discharge air according to one or more embodiments of the disclosure. At block 802, the ventilation discharge air may be filtered. For example, the gas turbine compartment 126 may be provided with filtered air from the filter house 112, or the gas turbine compartment 126 may in communication with a filter that is separate from the filter house 112. At block 804, a part load gas turbine or combined cycle output demand may be determined. At block 806, if output load demand is below nominal minimum capability, then heated air from the gas turbine compartment 126 may be supplied to the IBH manifold 118. At block 808, if the heated air flow to the IBH manifold 118 is greater than that required to match the output load demand, then excess flow may be discharged to the atmosphere in order to meet the load demand set-point.

It should be apparent that the foregoing relates only to certain embodiments of the present application and that numerous changes and modifications may be made herein by one of ordinary skill in the art without departing from the general spirit and scope of the disclosure as defined by the following claims and the equivalents thereof.

That which is claimed is:

1. A system for utilizing gas turbine compartment ventilation discharge air, the system comprising:
   a gas turbine engine comprising a compressor;
   a gas turbine compartment disposed around the gas turbine engine, wherein waste heat from the gas turbine engine heats air within the gas turbine compartment to produce ventilation discharge air;
   an inlet bleed heat (IBH) manifold in fluid communication with the compressor via a first conduit and the gas turbine compartment via a second conduit, wherein the first conduit provides the IBH manifold with compressor discharge bleed air from the compressor, and wherein the second conduit provides the IBH manifold with the ventilation discharge air from the gas turbine compartment; and
   at least one extraction blower disposed along the second conduit between the gas turbine compartment and the IBH manifold, wherein the at least one extraction blower is configured to provide the IBH manifold with the ventilation discharge air from the gas turbine compartment.

2. The system of claim 1, further comprising a ventilation discharge air control valve disposed between the gas turbine compartment and the IBH manifold and between the first conduit and the second conduit, wherein the ventilation discharge air control valve is configured to regulate the ventilation discharge air provided to the IBH manifold.

3. The system of claim 1, further comprising a bleed air control valve disposed along the first conduit between the compressor and the IBH manifold, wherein the bleed air control valve is configured to regulate the compressor discharge bleed air provided to the IBH manifold.

4. The system of claim 1, wherein the gas turbine compartment is in fluid communication with an atmosphere via a third conduit.

5. The system of claim 4, further comprising a vent control valve disposed along the third conduit between the gas turbine compartment and the atmosphere, wherein the vent control valve is configured to regulate the ventilation discharge air vented to the atmosphere.

6. The system of claim 4, further comprising one or more inlet air filters in fluid communication with the gas turbine compartment via a fourth conduit configured to provide filtered air to the gas turbine compartment.

7. The system of claim 6, further comprising a filtered air control valve disposed along the fourth conduit between the one or more inlet air filters and the gas turbine compartment, wherein the filtered air control valve is configured to regulate the filtered air provided to the gas turbine compartment.

8. The system of claim 6, further comprising a filter house configured to provide the filtered air to the gas turbine engine, wherein the one or more inlet air filters are associated with the filter house.

9. The system of claim 6, wherein the gas turbine compartment is in fluid communication with an atmosphere via a fifth conduit configured to provide unfiltered air to the gas turbine compartment.

10. The system of claim 9, further comprising an unfiltered air control valve disposed along the fifth conduit between the gas turbine compartment and the atmosphere, wherein the unfiltered air control valve is configured to regulate the unfiltered air provided to the gas turbine compartment.

11. The system of claim 1, wherein the gas turbine engine comprises:
   a combustor in communication with the compressor; and
   a turbine in communication with the combustor.

12. The system of claim 1, further comprising additional waste heat sources in communication with the IBH manifold.

13. A system for utilizing gas turbine compartment ventilation discharge air, the system comprising:
   a compressor;
   a combustor in communication with the compressor;
   a turbine in communication with the combustor;
   a gas turbine compartment disposed around one or more of the compressor, the combustor, and the turbine, wherein waste heat from the gas turbine engine heats air within the gas turbine compartment to produce ventilation discharge air;
   an inlet bleed heat (IBH) manifold in fluid communication with the compressor via a first conduit and the gas turbine compartment via a second conduit, wherein the first conduit provides the IBH manifold with compressor discharge bleed air from the compressor, and wherein the second conduit provides the IBH manifold with the ventilation discharge air from the gas turbine compartment; and
   at least one extraction blower disposed along the second conduit between the gas turbine compartment and the IBH manifold, wherein the at least one extraction blower is configured to provide the IBH manifold with the ventilation discharge air from the gas turbine compartment.

14. The system of claim 13, further comprising one or more inlet air filters in fluid communication with the gas turbine compartment configured to provide filtered air to the gas turbine compartment.

* * * * *